United States Patent
Zhang et al.

(10) Patent No.: US 10,855,707 B2
(45) Date of Patent: *Dec. 1, 2020

(54) SECURITY SYSTEM USING AUTOMATIC AND SCALABLE LOG PATTERN LEARNING IN SECURITY LOG ANALYSIS

(71) Applicant: NEC CORPORATION, Tokyo (JP)

(72) Inventors: Hui Zhang, Princeton Junction, NJ (US); Jianwu Xu, Lawrenceville, NJ (US); Bo Zong, Plainsboro, NJ (US)

(73) Assignee: NEC CORPORATION

(*) Notice: Subject to any disclaimer, the term of this patent is extended or adjusted under 35 U.S.C. 154(b) by 389 days.

This patent is subject to a terminal disclaimer.

(21) Appl. No.: 15/889,738

(22) Filed: Feb. 6, 2018

(65) Prior Publication Data
US 2018/0270263 A1  Sep. 20, 2018

Related U.S. Application Data

(60) Provisional application No. 62/473,694, filed on Mar. 20, 2017, provisional application No. 62/474,141, (Continued)

(51) Int. Cl.
*G06F 11/00* (2006.01)
*H04L 29/06* (2006.01)
(Continued)

(52) U.S. Cl.
CPC ......... *H04L 63/1425* (2013.01); *G06N 5/047* (2013.01); *G06N 20/00* (2019.01);
(Continued)

(58) Field of Classification Search
CPC ............. H04L 63/1408; H04L 63/1416; H04L 63/1425; H04L 63/02; H04L 63/0227; G06N 20/00
See application file for complete search history.

(56) References Cited

U.S. PATENT DOCUMENTS

| | | | |
|---|---|---|---|
| 7,424,619 B1* | 9/2008 | Fan ...................... | G06F 21/552 713/188 |
| 8,402,543 B1* | 3/2013 | Ranjan ................ | H04L 63/1416 726/23 |

(Continued)

OTHER PUBLICATIONS

Jeon et al., NPL: A Study on the Big Data Log Analysis for Security, pp. 13-20, 2016.*

(Continued)

*Primary Examiner* — Farid Homayounmehr
*Assistant Examiner* — Lizbeth Torres-Diaz
(74) *Attorney, Agent, or Firm* — Joseph Kolodka (57) ABSTRACT

A security system using automatic and scalable log pattern learning in security log analysis is provided. The security system includes one or more management services configured to generate security logs, and a security log analysis service operatively coupled to the one or more management services. The security log analysis service is configured to collect the security logs generated by the one or more management services, implement an incremental learning process to generate a set of log patterns from the collected security logs, parse the collected security logs using the set of log patterns, and analyze the parsed security logs for one or more security applications.

20 Claims, 6 Drawing Sheets

Related U.S. Application Data filed on Mar. 21, 2017, provisional application No. 62/537,015, filed on Jul. 26, 2017.

(51) Int. Cl.
    *G06N 20/00*      (2019.01)
    *G06N 5/04*      (2006.01)

(52) U.S. Cl.
    CPC .......... *H04L 63/02* (2013.01); *H04L 63/1416* (2013.01); *H04L 63/0209* (2013.01); *H04L 63/0272* (2013.01); *H04L 63/0281* (2013.01); *H04L 63/1458* (2013.01)

(56) References Cited

U.S. PATENT DOCUMENTS

| | | | | |
|---|---|---|---|---|
| 10,698,421 | B1* | 6/2020 | Harris | G05D 1/0289 |
| 2002/0162017 | A1* | 10/2002 | Sorkin | H04L 63/1408 |
| | | | | 726/4 |
| 2014/0149323 | A1* | 5/2014 | Fisher | G06N 20/00 |
| | | | | 706/12 |
| 2014/0344622 | A1* | 11/2014 | Huang | G06F 11/0775 |
| | | | | 714/37 |
| 2015/0154646 | A1* | 6/2015 | Mishra | G06F 19/3418 |
| | | | | 705/3 |
| 2015/0256551 | A1* | 9/2015 | Kang | H04L 67/10 |
| | | | | 726/23 |
| 2015/0281260 | A1* | 10/2015 | Arcamone | H04L 63/1408 |
| | | | | 726/11 |
| 2018/0096175 | A1* | 4/2018 | Schmeling | G06Q 10/08 |
| 2018/0270263 | A1* | 9/2018 | Zhang | G06N 5/047 |
| 2018/0315141 | A1* | 11/2018 | Hunn | G06F 40/42 |
| 2020/0082104 | A1* | 3/2020 | Hwang | G06N 20/00 |

OTHER PUBLICATIONS

Ning, et al., HLAer: a System for Heterogeneous Log Analysis, SDM Workshop on Heterogeneous Learning, 2014, pp. 1-22.

Apache Hadoop—http://hadoop.apache.org/, last published Dec. 18, 2017, pp. 1-8.

* cited by examiner

100

Obtain logs from one or more components of a computer system to generate a training set for log pattern learning
110

↓

Implement an incremental learning process to generate a set of log patterns from the training set
120

↓

Parse the logs using the set of log patterns, and apply a set of applications to the parsed logs
130

```
IncrementalLearning(training logs L, known pttn patterns P, logs with unknown patterns U)
 L – the total training log set;
 P – set of pttn files generated so far, initially set as empty;
 U – logs that have no matching patterns in the set P;
{
 if(U is empty || no more patterns HLA can recognize on U)
          return buildIndex(P); //return the final grok pattern set after training
 Sampling(U) -> S ; //generate a log set sampled from U
 HLA(S) -> N; //call HLA to learn the new log pattern set N
 P +=N;          //accumulate the pttn patterns learnt so far
 Logstash(N, U) -> U;//call Logstash to update the log set with
                                     //unknown patterns return IncrementalLearning(L, P, U);
}
```

SECURITY SYSTEM USING AUTOMATIC AND SCALABLE LOG PATTERN LEARNING IN SECURITY LOG ANALYSIS

RELATED APPLICATION INFORMATION

This application claims priority to U.S. Provisional Patent Application No. 62/473,694, filed on Mar. 20, 2017, U.S. Provisional Patent Application No. 62/474,141, filed on Mar. 21, 2017, and U.S. Provisional Patent Application No. 62/537,015, filed on Jul. 25, 2017, all incorporated by reference herein in their entirety.

This application is related to applications entitled "Method and System for Incrementally Learning Log Patterns of Heterogeneous Logs," having Ser. No. 15/889,666, and "Automatic and Scalable Log Pattern Learning in Security Log Analysis," having Ser. No. 15/889,733, all incorporated by reference herein in their entirety.

BACKGROUND

Technical Field

The present invention relates to log analysis, and more particularly to a security system using automatic and scalable log pattern learning in security log analysis.

Description of the Related Art

A computer-generated record, referred to as a log or a log record, is data output generated from source code associated with a computer system component (e.g., network device, operating system, application and programmable devices) that documents activities performed by the computer system component. A log can include one or more lines of sentences that record system/application events or status at a time corresponding to a time stamp. Log analytics can be performed for a variety of practical applications, such as software debugging, compliance, computer system troubleshooting, forensics and investigations, security incident response and web analytics (e.g., search engine optimization).

Computer systems can generate a vast number of logs from a variety of components, such as in the form of heterogeneous logs. Heterogeneous logs can provide rich contextual information describing system status and are critical sources for system monitoring and diagnosis. However, manually interpreting heterogeneous logs is not effective due to large volume and complicated domain-specific syntax and semantic knowledge.

SUMMARY

According to an aspect of the present principles, a security system is provided for providing computer system security. The security system includes one or more management services configured to generate security logs, and a security log analysis service operatively coupled to the one or more management services. The security log analysis service is configured to collect the security logs generated by the one or more management services, implement an incremental learning process to generate a set of log patterns from the collected security logs, parse the collected security logs using the set of log patterns, and analyze the parsed security logs for one or more security applications.

According to another aspect of the present principles, a method is provided for providing computer system security. The method includes a processor operatively coupled to a memory collecting security logs generated by one or more management services of a security system, implementing an incremental learning process to generate a set of log patterns from the collected security logs, parsing the collected security using the set of log patterns, and analyzing the parsed security logs for one or more security applications.

According to another aspect of the present principles, a computer program product having program instructions embodied therewith is provided. The program instructions are executable by a computer to cause the computer to perform a method for providing computer system security. The method includes collecting security logs generated by one or more management services of a security system. An incremental learning process is implemented to generate a set of log patterns from the collected security logs. The collected security logs are parsed using the set of log patterns. The parsed security logs are analyzed for one or more security applications.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Numerous log messages are generated every day by social networks, banking systems, health care systems, smart cities, Internet of Things (IoT) devices etc. Administrators are interested in analyzing these log messages in order to, for example, predict future events, detect anomalies or debug performance problems. To analyze logs, the logs first need to be parsed understand their content. One way to parse logs is to come up with some regular expressions (regex) manually. This is difficult to do, since logs have different formats, and there is no prior knowledge about how many unique formats exist in the logs. In addition, Web server and IoT devices can generate millions of logs every day. To keep up with this rate, the log parser should be able to handle millions of logs in few hours.

Heterogeneous log analysis (HLA) is a machine learning approach that can provide for log pattern analysis, and can perform heterogeneous log categorization, automatic log format recognition, and heterogeneous log indexing. Additionally, HLA can support queries and outlier detection on heterogeneous logs. HLA can provide a framework which is purely data-oriented and thus general enough to adapt to arbitrary log formats, applications or systems.

An illustrative implementation of HLA is Heterogeneous Log Analyzer (HLAer). HLAer generates clusters implementing OPTICS (Ordering Points to Identify the Clustering Structure) from the input logs based two parameters: ε and MinPts. Then, for every cluster, HLAer generates a pattern using an UPGMA (Unweighted Pair Group Method with Arithmetic Mean) algorithm.

HLA can suffer from scalability and flexibility problems due to operational complexity, making it hard to scale-up to a large training log set. In the particular context of HLAer, for a given dataset having n logs with average length of l, the time complexity of OPTICS is $O(n^2 \cdot l)$, and the time complexity of UPGMA is $$O\left(m \cdot \left(\frac{n}{m}\right)^2 \cdot l^2\right)$$

considering m clusters each has $$\frac{n}{m}$$

logs. In addition, OPTICS requires $O(n^2)$ memory space. For a real dataset, there can be 100,000,000 logs with the average length of 100 fields. Accordingly, considering these numbers, HLAer particularly suffers from a severe scalability problem.

One manner of dealing with machine learning on a large data set is by using a scale-out Big-Data platform such as Apache™ Hadoop®. In Hadoop®, a MapReduce version of an original machine learning approach is implemented so that multiple replicas of the same machine learning processes are executed concurrently on a cluster of machines, in which all the data set will be loaded and analyzed in the memory of multiple machines. This is a brute-force approach and requires the availability of abundant computing and networking resources.

The embodiments described herein address the above-noted scalability problem by implementing an incremental learning approach. When abundant computing and networking resources (e.g., a large cluster of networked servers) are not available for the log pattern learning task, the incremental learning approach according to the present principles takes a divide-and-conquer approach, and integrates learning and log filtering to overcome the above-noted scalability issue. This divide-and-conquer approach will continue until the procedure has processed all of the training logs.

The incremental learning scheme provided herein solves the aforementioned problems by applying and integrating advanced machine learning techniques with recursive algorithm design principles to enable automated log analysis with controllable resource requirements. The incremental learning approach recursively learns a subset of log patterns based on a log sample, and uses the learned patterns to filter out logs before proceeding to the next iteration. Multiple iterations are executed sequentially until all log patterns are discovered.

The embodiments described herein can significantly reduce the computing resource cost of learning log patterns within a vast amount of heterogeneous log data from various system components and/or applications, even when prior knowledge about the system might not be available. By integrating advanced machine learning techniques with recursive algorithm design principles, the incremental learning approach described herein constructs an automatic sequential pattern recognition method for heterogeneous logs in a principled way that allows for faster operation upon system updates. Accordingly, the incremental learning mechanism described herein improves the performance and operation of a computer system.

Although the embodiments described herein will be illustratively applied within the context of HLA (e.g., HLAer), the scalability of other similar techniques can be improved in accordance with the embodiments described herein.

Figure 1:
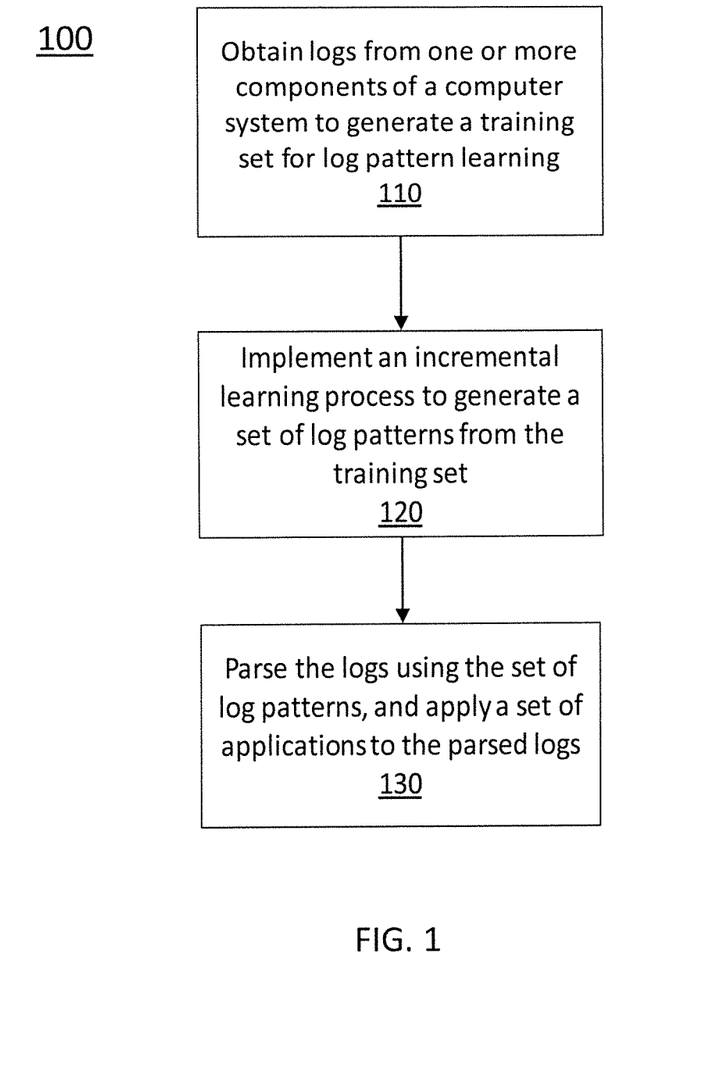
FIG. 1 is a block/flow diagram illustrating a system/method for generating a set of log patterns, in accordance with the present principles.

Referring now in detail to the figures in which like numerals represent the same or similar elements and initially to FIG. 1, a system/method 100 for incremental learning on log pattern recognition is illustratively depicted in accordance with one embodiment of the present principles.

At block 110, logs are obtained from one or more sources to generate a training set for log pattern learning. Each log can include a time stamp and text content with one or more fields. In one embodiment, the logs include heterogeneous logs. The one or more sources can include arbitrary and/or unknown systems or applications.

At block 120, an incremental learning process is implemented to generate a set of log patterns from the training set. Each pattern of the set of log patterns can be in terms of regular expression (regex). Regex is a sequence of characters that defines a search pattern. Such a regex pattern can be used by a search algorithm (e.g., string searching algorithm) for performing one or more operations on strings (e.g., find operation). Further details regarding the incremental learning process performed at block 120 will now be described with reference to FIG. 2.

Figure 2:
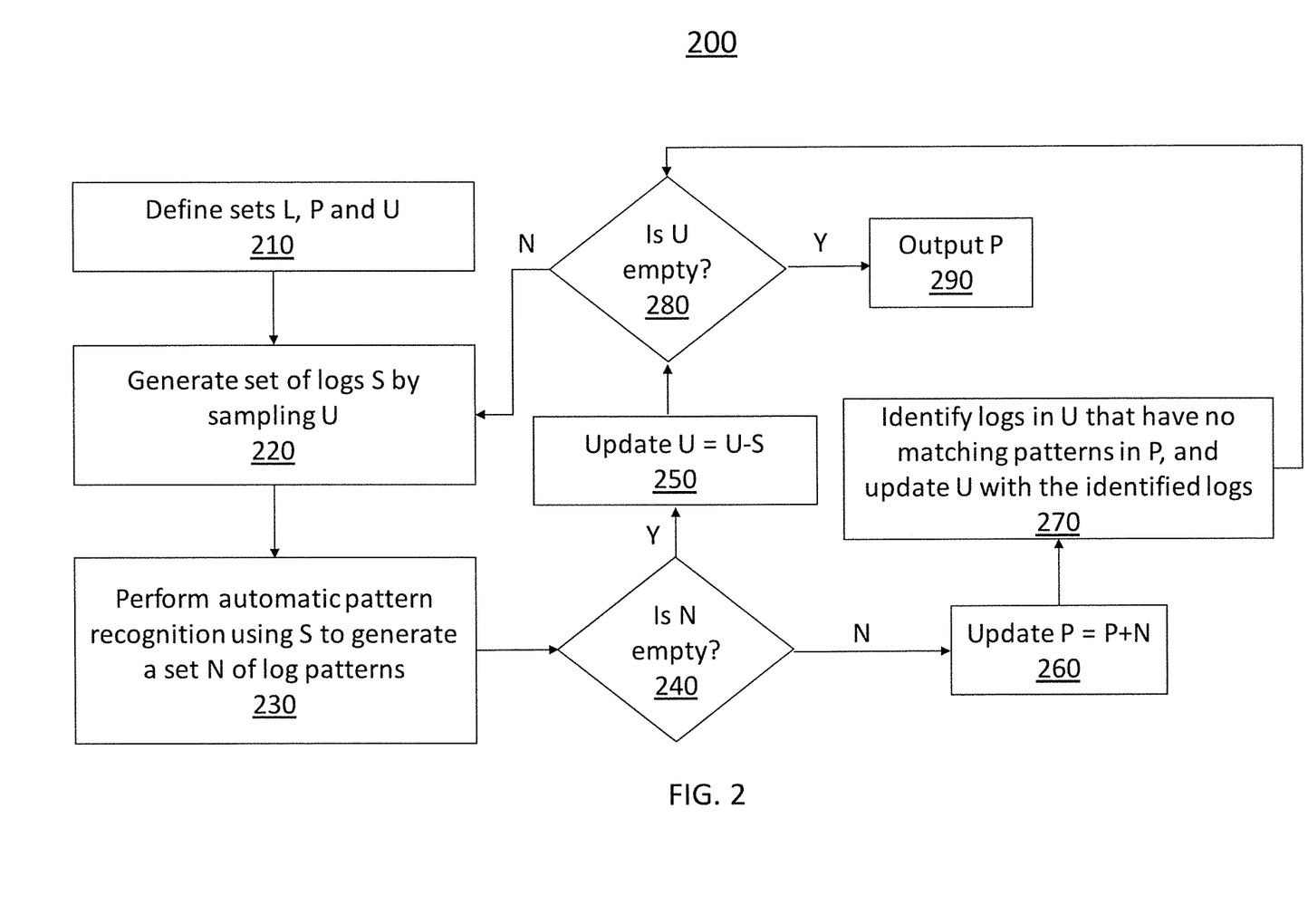
FIG. 2 is a block/flow diagram illustrating a system/method for implementing an incremental learning process to generate a set of log patterns, in accordance with the present principles.

Referring now to FIG. 2, a system/method 200 for implementing an incremental learning process to generate a set of log patterns is illustratively depicted in accordance with one embodiment of the present principles.

At block 210, sets L, P and U are defined. L is defined as a training set of logs, such as the training set output at block 110 of FIG. 1. P is a set of log patterns that have been generated so far. U is defined as a set of logs of the training set that have no matching patterns in P. Accordingly, initially, P is defined as an empty set, and U is equivalent to L.

At block 220, a set of logs S is generated by sampling U. For example, S can be generated from U by sequential sampling. In one embodiment, S has size K, where K is a parameter that controls a maximum resource requirement for the incremental learning process (e.g., K=5000). K can be a user-specified value. Once S reaches K number of logs, the sampling procedure stops. If the size of U is less than K, then S is equivalent to U.

At block 230, automatic log pattern recognition is performed using S to generate a set of log patterns N. In one embodiment, performing the automatic log pattern recognition includes applying one or more machine learning techniques on set S. An example of such a machine learning technique is HLA (e.g., HLAer).

The following is an example of one possible automatic log pattern recognition procedure that can be performed at block 230 to generate N.

The logs of S are tokenized to generate semantically meaningful tokens from the logs. Any tokenization procedure suitable for generating tokens from the logs can be used in accordance with the embodiments described herein. After the logs are tokenized, a similarity measurement on the logs is applied. This similarity measurement leverages both log layout information and log content information, and is specially tailored to arbitrary logs. Once the similarities among the logs are captured, a hierarchical clustering method can be applied to generate and output a log cluster hierarchy. Any hierarchical clustering method can be implemented in accordance with the embodiments described herein. Once the log cluster hierarchies are received, the logs are aligned within each cluster that is on the lowest level in the log cluster hierarchy. The log alignment is designed to preserve the unknown layouts of the logs in order to facilitate log pattern recognition.

Once the logs are aligned, log motif discovery is conducted to find log motifs (e.g., the most representative layouts and log fields). Pattern recognition is then performed from such motifs. To do this, fields including time stamps, Internet Protocol (IP) addresses and universal resource locators (URLs) are recognized. Next, other fields which are highly conserved in the logs are recognized and organized in a data structure in the cluster hierarchy. Note that the log motif discovery and pattern recognition are initially performed in the lowest level of the log cluster hierarchy. All of the information is then backpropagated up to higher levels in the log cluster hierarchy, and fused with their local patterns to provide format pattern representations from the logs.

Blocks 240-290 collectively represent a log filtering process performed based on the set of log patterns generated at block 230 (i.e., N).

At block 240, it is determined if N is empty.

If N is determined to be empty, U is updated so that U=U−S at block 250.

If N is not determined to be empty at block 240, then P is updated so that P=P+N at block 260. That is, the log patterns of N are added to P.

At block 270, logs in U that have no matching patterns in P are identified, and U is updated with the identified logs. In one embodiment, a log parser is used to identify the logs. An example of a log parser that can be used to identify the logs is Logstash®.

After U is updated either at block 250 or at block 270, it is determined if U is empty at block 280. If U is determined not to be empty, then the process reverts back to block 220. However, if U is determined to be empty, P is output at block 290 and the incremental learning process ends.

Figure 3:
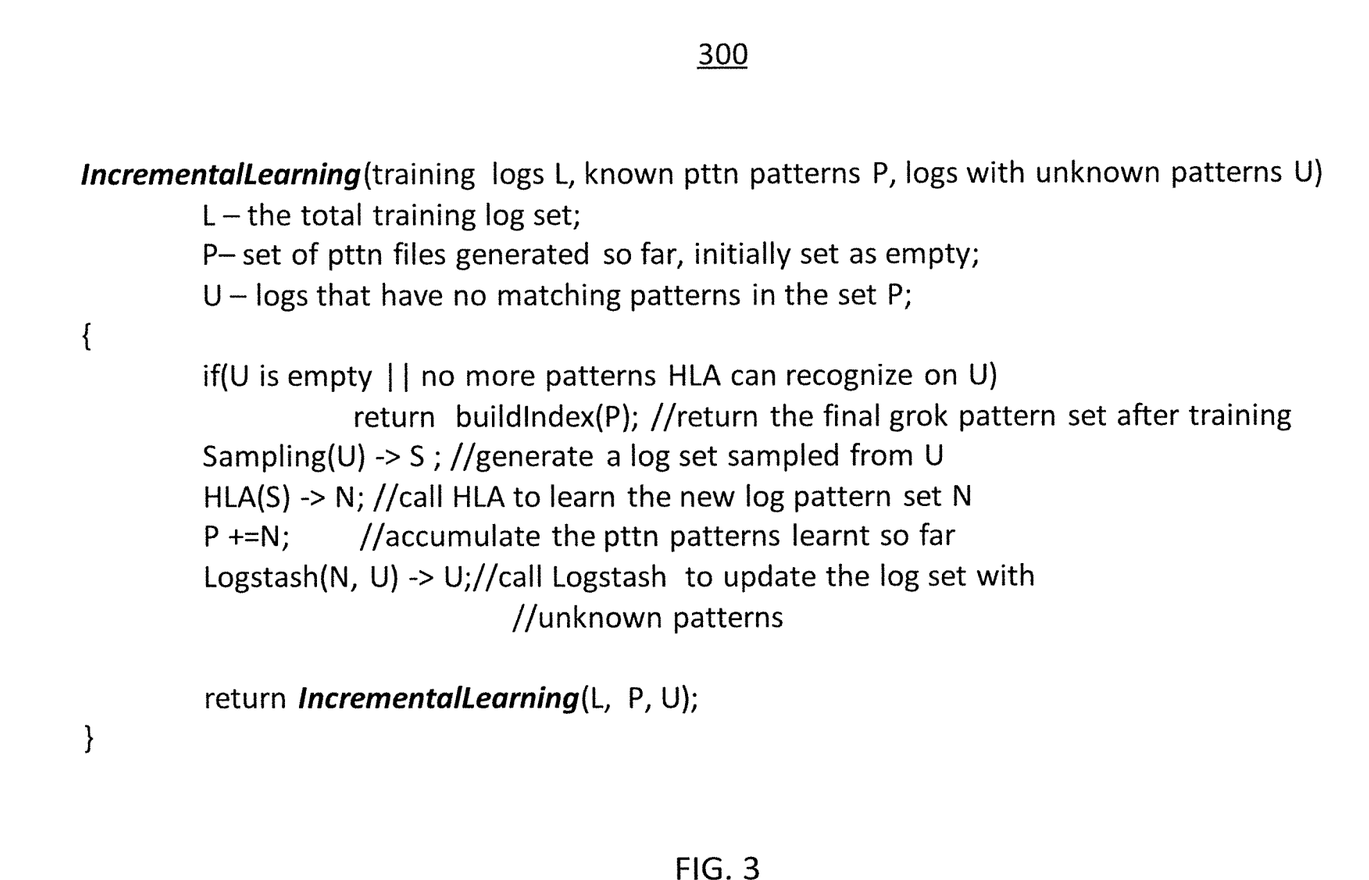
FIG. 3 illustrates exemplary pseudocode for implementing an incremental learning process to generate a set of log patterns, in accordance with the present principles.

Referring now to FIG. 3, exemplary pseudocode 300 for implementing the incremental learning process of FIG. 2 is illustratively depicted in accordance with one embodiment of the present principles.

As shown, IncrementalLearning inputs are defined, which include sets L, P and U, as described above in FIG. 2. P is returned after the training if U is empty or there are no more patterns that HLA can recognize on U. A set of logs S is generated by sampling U, as described above in FIG. 2. Automatic log pattern recognition is performed using S to generate a set of log patterns N (e.g., by calling HLA to learn N), as described above in FIG. 2. Patterns generated/learnt so far are accumulated into P, as described above in FIG. 2. A log parser (e.g., Logstash®) is called to update U with the logs identified from N, as described above in FIG. 2. IncrementalLearning(L, P, U) is returned.

Referring back to FIG. 1, at block 130, the logs are parsed using the set of log patterns, and a set of applications are applied to the parsed logs. The set of applications can include one or more management applications. For example, a log-based fault management application can be applied to detect abnormal logs that do not match any log pattern of the set of log patterns.

If the logs being analyzed are security logs or alerts, security log analysis can be performed to provide computer system security. One implementation of security log analysis is provided by security information and event management (SIEM) software products and services, which combine security information management (SIM) and security event management (SEM). These products and services provide real-time analysis of security logs generated by network hardware and applications. One challenge regarding SIEM log analytics is the scalability of log parsing. For example, during a Distributed Denial-of-Service (DDoS) attack, in which multiple computer systems flood the bandwidth and/or resources of a target computer system with traffic, the number of logs generated by the log-in process could be huge. The system administrator of the target computer system needs to quickly determine the origins of the DDoS attack by analyzing the logs. Therefore, it is imperative to produce log patterns (e.g., regex) in a timely manner to aid in the analysis. On the other hand, the large scale of logs may slow down the log pattern generation procedure if the resources are not managed properly. Thus, the incremental learning procedure in accordance with the embodiments described herein can handle the aforementioned scalability problem without sacrificing the accuracy and the quality of the log patterns.

Figure 4:
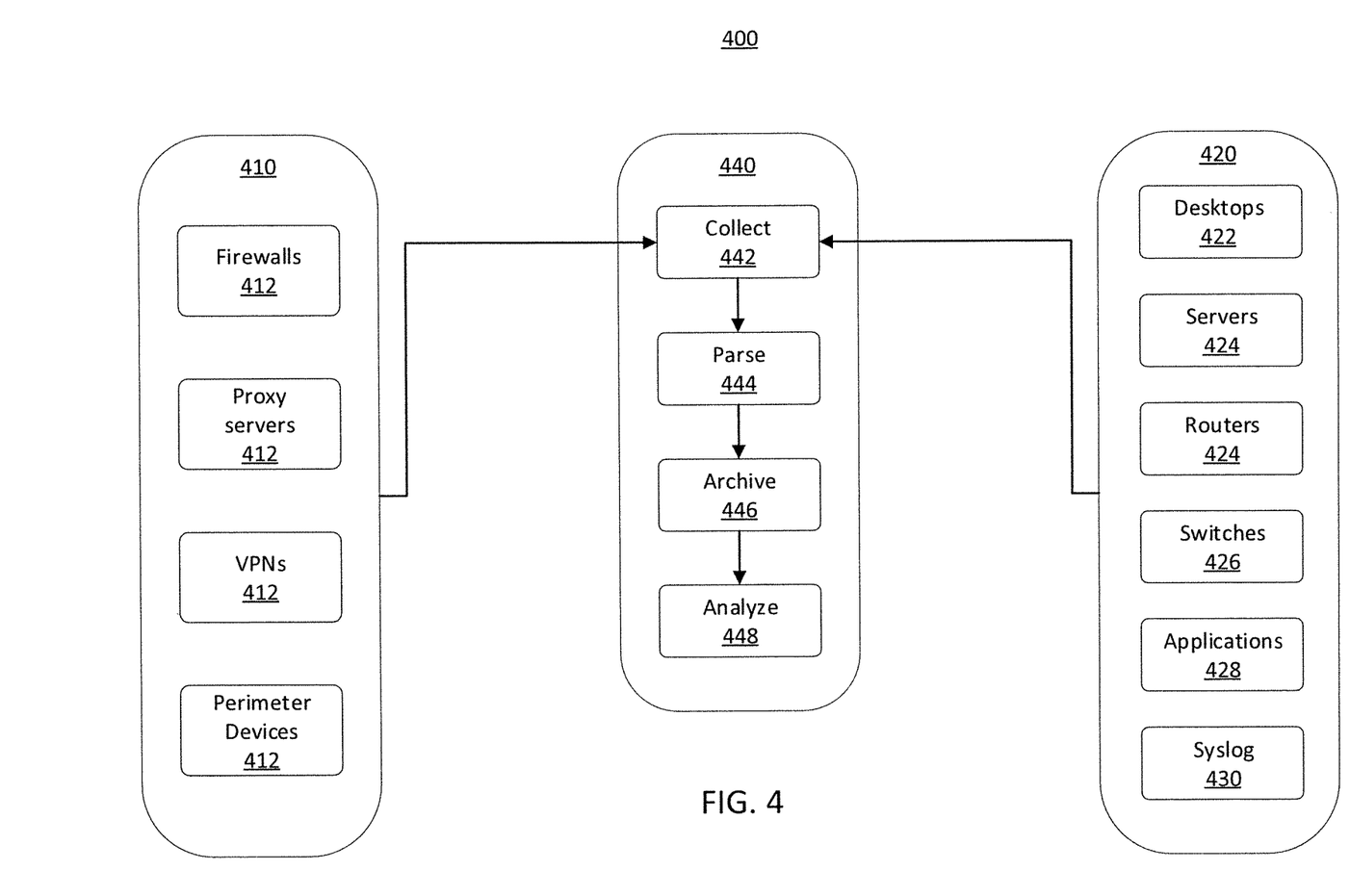
FIG. 4 is a block/flow diagram illustrating a system/method for security log analysis, in accordance with the present principles.

Referring to FIG. 4, a system/method 400 for implementing a security log analysis service is illustratively depicted in accordance with one embodiment of the present principles.

In this illustrative embodiment, the system/method 400 is implemented utilizing a SIEM service that includes SEM 410 and SIM 420. SEM 410 can illustratively include one or more firewalls 412, one or more proxy servers 414, one or more virtual private networks (VPNs) 416, and one or more perimeter devices 418. SIM 420 can illustratively include one or more desktops 422, one or more servers 424, one or more routers 426, one or more switches 428, one or more applications 430 and one or more syslog devices 432.

Security logs from SEM 410 and SIM 420 are analyzed by Security Log Analysis (SLA) 440.

At block 442, the security logs are collected from SEM 410 and SIM 420. A vast number of log messages can be generated every day by SIEM network hardware and applications.

At block 444, the collected security logs are parsed as structured data. One traditional way to parse the logs is to come up with some regular expressions (regex) manually. This can be hard to do because logs can have different formats, and there may be no prior knowledge about how many unique formats exist in the logs. Thus, an automatic and scalable log pattern generation approach is highly desired for parsing the security logs, such as the approach described herein above with reference to FIGS. 1-3.

At block 446, the parsed security logs are archived and, at block 448, are further analyzed for different security applications. Examples of such security applications include intrusion detection and forensic analysis.

Figure 5:
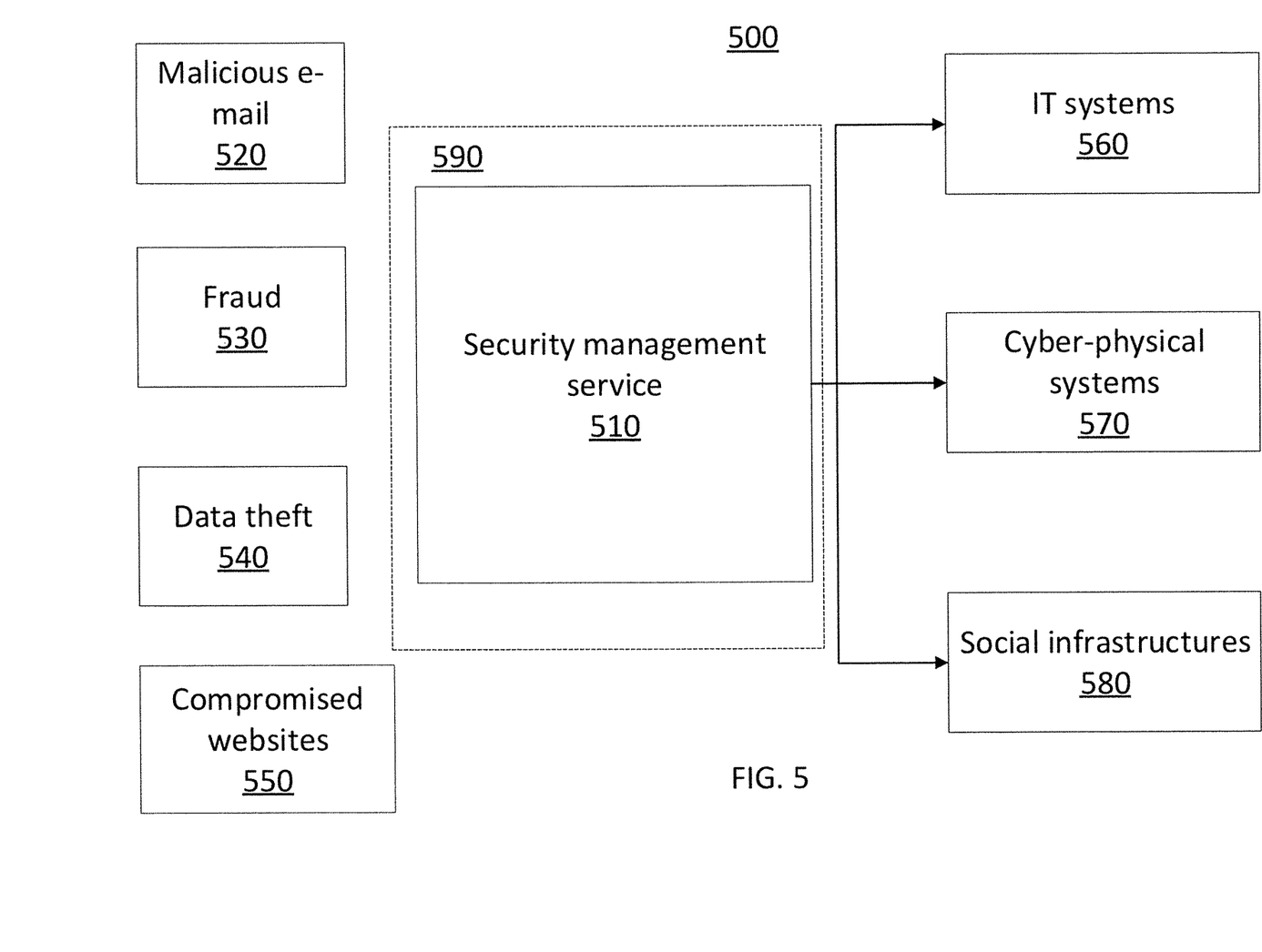
FIG. 5 is a block/flow diagram illustrating a system/method for applying a security information and event management service system, in accordance with the present principles.

Referring to FIG. 5, a system/method 500 for implementing a security management service 510 is illustratively depicted in accordance with one embodiment of the present principles. In one embodiment, the security management service 510 utilizes SIEM, as described above with reference to FIG. 4. The security management service 510 can provide security against a multitude of potential computer system security threats, including but not limited to malicious e-mail 520, fraud 530, data theft 540 and compromised websites 550. In addition, the security management service 510 can provide security for a multitude of applications, including but not limited to IT systems 560 (e.g., data centers), cyber-physical systems 570 (e.g., power plant control systems) and social infrastructures 580 (e.g., smart cities).

Embodiments described herein may be entirely hardware, entirely software or including both hardware and software elements. In a preferred embodiment, aspects of the present invention are implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
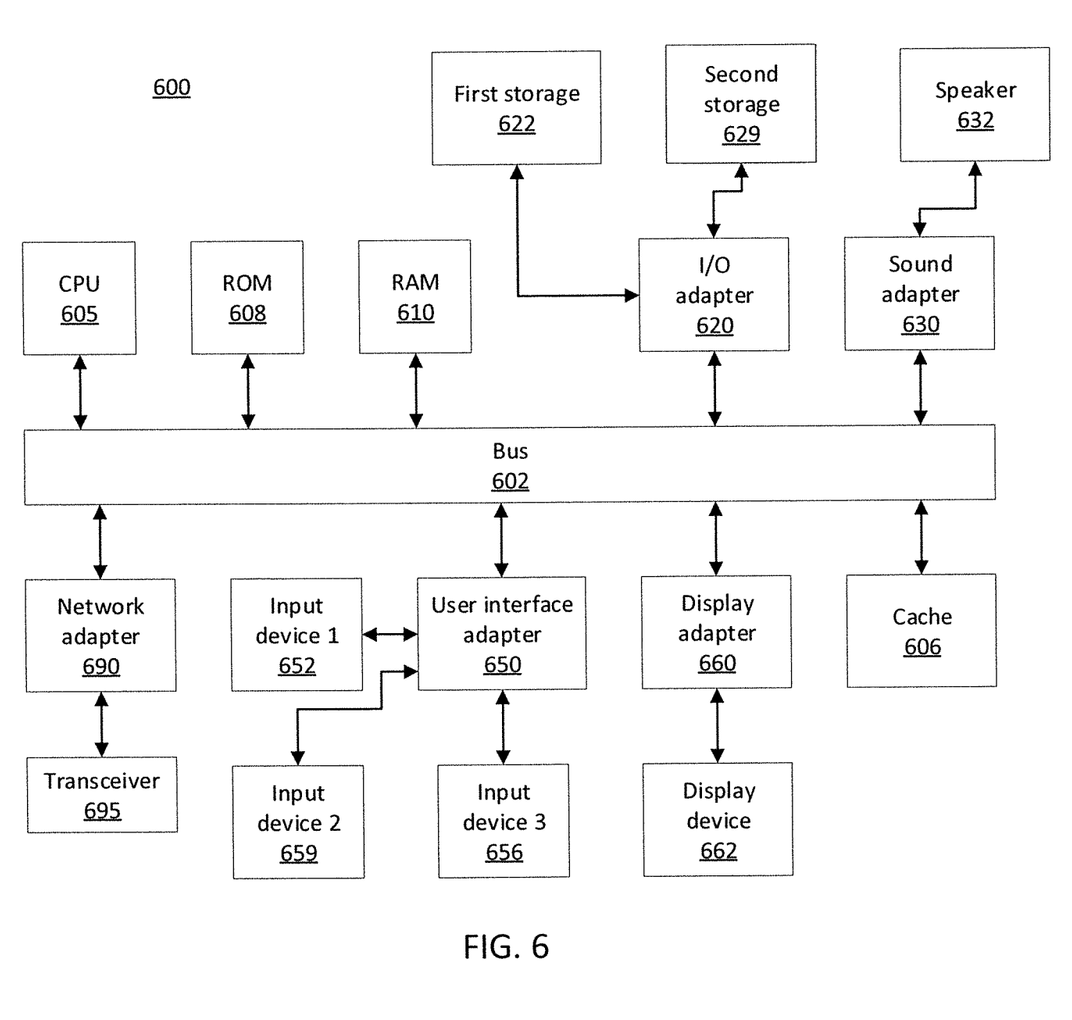
FIG. 6 is a block/flow diagram illustrating a computer system, in accordance with the present principles.

Referring now to FIG. 6, an exemplary computer system 600 is shown which may represent a server or a network device, in accordance with an embodiment of the present invention. The computer system 600 includes at least one processor (CPU) 605 operatively coupled to other components via a system bus 602. A cache 606, a Read Only Memory (ROM) 608, a Random-Access Memory (RAM) 610, an input/output (I/O) adapter 620, a sound adapter 630, a network adapter 690, a user interface adapter 650, and a display adapter 660, are operatively coupled to the system bus 602.

A first storage device 622 and a second storage device 629 are operatively coupled to system bus 602 by the I/O adapter 620. The storage devices 622 and 629 can be any of a disk storage device (e.g., a magnetic or optical disk storage device), a solid state magnetic device, and so forth. The storage devices 622 and 629 can be the same type of storage device or different types of storage devices.

A speaker 632 may be operatively coupled to system bus 602 by the sound adapter 630. A transceiver 695 is operatively coupled to system bus 602 by network adapter 690. A display device 662 is operatively coupled to system bus 602 by display adapter 660.

A first user input device 652, a second user input device 659, and a third user input device 656 are operatively coupled to system bus 602 by user interface adapter 650. The user input devices 652, 659, and 656 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 652, 659, and 656 can be the same type of user input device or different types of user input devices. The user input devices 652, 659, and 656 are used to input and output information to and from system 600.

Of course, the computer system 600 may also include other elements (not shown), as readily contemplated by one of skill in the art, as well as omit certain elements. For example, various other input devices and/or output devices can be included in computer system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 600 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A security system for providing computer system security, comprising:
   one or more management services implemented by at least one hardware component and configured to generate security logs, the one or more management services including a security event management (SEM) service and a security information management (SIM) service for implementing a security information and event management (SIEM) service; and
   a security log analysis service operatively coupled to the one or more management services, wherein the security log analysis service is configured to:
      collect the security logs generated by the one or more management services;
      implement an incremental learning process to generate a set of log patterns from the collected security logs;
      parse the collected security logs using the set of log patterns to obtain parsed security logs; and
      analyze the parsed security logs for one or more security applications;
   wherein, in implementing the incremental learning process to generate the set of log patterns, the security log analysis service is further configured to:
      define a first set as the training set, a second set as a set of log patterns that have been generated, and a third set as a set of logs of the training set that lack a matching pattern in the second set;
      sample the third set to generate a fourth set, wherein the fourth set has a size corresponding to a parameter controlling a maximum resource requirement for the incremental learning process;
      perform automatic log pattern recognition to generate a fifth set; and
      perform a log filtering process based on the fifth set.

2. The security system as recited in claim 1, wherein the SEM service is implemented using at least one hardware component selected from the group consisting of: firewall, proxy server, virtual private network, perimeter device, and combinations thereof.

3. The security system as recited in claim 1, wherein the SIM service is implemented using at least one hardware component selected from the group consisting of: desktop, server, router, switch, application, syslog device, and combinations thereof.

4. The security system as recited in claim 1, wherein the collected security logs are parsed as structured data.

5. The security system as recited in claim 1, wherein the security logs include heterogeneous logs.

6. The security system as recited in claim 1, wherein each pattern of the set of log patterns is in terms of regular expression.

7. The security system as recited in claim 1, wherein, in performing the automatic log pattern recognition, the at least one hardware processor of the security log analysis service is further configured to:
   tokenize logs of the fourth set to generate tokens from the logs of the fourth set;
   apply a similarity measurement on the logs to capture similarities among the logs of the fourth set;
   implement a hierarchical clustering algorithm to generate a log cluster hierarchy for the logs of the fourth set;
   align the logs of the fourth set within each cluster associated with a given level of the log cluster hierarchy;
   conduct log motif discovery on the aligned logs to find log motifs; and
   perform pattern recognition from the log motifs by recognizing one or more log fields.

8. The security system as recited in claim 1, wherein, in performing the log filtering process, the security log analysis service is further configured to:
   determine if the fifth set is empty;
   in response to determining that the fifth set is empty:
      update the third set by subtracting the fourth set from the third set;
      in response to determining that the updated third set is empty, output the second set; and
      in response to determining that the updated third set includes at least one log,
      update the fourth set by sampling the updated third set, and updating the fifth set by performing automatic pattern recognition using the updated fourth set; and
   in response to determining that the fifth set includes at least one log pattern:
      update the second set by adding the fifth set to the second set;
      update the third set with logs identified in the third set that lack a matching pattern in the second set;
      in response to determining that the updated third set is empty, output the updated second set; and
      in response to determining that the updated third set includes at least one log, update the fourth set by sampling the updated third set, and update the fifth set by performing automatic pattern recognition using the updated fourth set.

9. The security system as recited in claim 8, wherein the security log analysis service is further configured to use a log parser to identify the logs in the third set that lack a matching pattern in the second set.

10. The security system as recited in claim 1, wherein the security log analysis service is further configured to archive the security logs prior to the analysis.

11. The security system as recited in claim 1, wherein the one or more security applications include a log-based fault management application to detect abnormal logs that do not match any log pattern of the set of the log patterns.

12. A computer-implemented method for providing computer system security, comprising:
   collecting, by a processor operatively coupled to a memory, security logs generated by one or more management services of a security system, the one or more management services including a security event management (SEM) service and a security information management (SIM) service for implementing a security information and event management (SIEM) service;
   implementing, by the processor, an incremental learning process to generate a set of log patterns from the collected security logs;
   parsing, by the processor, the collected security logs using the set of log patterns to obtain parsed security logs; and
   analyzing, by the processor, the parsed security logs for one or more security applications;
   wherein implementing the incremental learning process to generate the set of log patterns further comprises:
      defining a first set as the training set, a second set as a set of log patterns that have been generated, and a third set as a set of logs of the training set that lack a matching pattern in the second set;
      sampling the third set to generate a fourth set, wherein the fourth set has a size corresponding to a parameter controlling a maximum resource requirement for the incremental learning process;

performing automatic log pattern recognition to generate a fifth set; and performing a log filtering process based on the fifth set.

13. The method as recited in claim 12, wherein performing the automatic log pattern recognition further comprises:

tokenizing logs of the fourth set to generate tokens from the logs of the fourth set;

applying a similarity measurement on the logs to capture similarities among the logs of the fourth set;

implementing a hierarchical clustering algorithm to generate a log cluster hierarchy for the logs of the fourth set;

aligning the logs of the fourth set within each cluster associated with a given level of the log cluster hierarchy;

conducting log motif discovery on the aligned logs to find log motifs; and performing pattern recognition from the log motifs by recognizing one or more log fields.

14. The method as recited in claim 12 wherein performing the log filtering process further comprises:

determining if the fifth set is empty;

in response to determining that the fifth set is empty:

updating the third set by subtracting the fourth set from the third set;

in response to determining that the updated third set is empty, outputting the second set; and in response to determining that the updated third set includes at least one log, updating the fourth set by sampling the updated third set, and updating the fifth set by performing automatic pattern recognition using the updated fourth set; and in response to determining that the fifth set includes at least one log pattern:

updating the second set by adding the fifth set to the second set;

updating the third set with logs identified in the third set that lack a matching pattern in the second set;

in response to determining that the updated third set is empty, outputting the updated second set; and in response to determining that the updated third set includes at least one log, updating the fourth set by sampling the updated third set, and updating the fifth set by performing automatic pattern recognition using the updated fourth set.

15. The method as recited in claim 14, further comprising using, by the processor, a log parser to identify the logs in the third set that lack a matching pattern in the second set.

16. The method as recited in claim 12, further comprising archiving, by the processor, the parsed security logs prior to the analysis.

17. A computer program product comprising a non-transitory computer readable storage medium having program instructions embodied therewith, the program instructions executable by a computer to cause the computer to perform a method for providing computer system security, comprising:

collecting security logs generated by one or more management services of a security system, the one or more management services including a security event management (SEM) service and a security information management (SIM) service for implementing a security information and event management (SIEM) service;

implementing an incremental learning process to generate a set of log patterns from the collected security logs;

parsing the collected security logs using the set of log patterns to obtain parsed security logs; and analyzing the parsed security logs for one or more security applications;

wherein implementing the incremental learning process to generate the set of log patterns further comprises:

defining a first set as the training set, a second set as a set of log patterns that have been generated, and a third set as a set of logs of the training set that lack a matching pattern in the second set;

sampling the third set to generate a fourth set, wherein the fourth set has a size corresponding to a parameter controlling a maximum resource requirement for the incremental learning process;

performing automatic log pattern recognition to generate a fifth set; and performing a log filtering process based on the fifth set.

18. The computer program product as recited in claim 17, wherein performing the automatic log pattern recognition further comprises:

tokenizing logs of the fourth set to generate tokens from the logs of the fourth set;

applying a similarity measurement on the logs to capture similarities among the logs of the fourth set;

implementing a hierarchical clustering algorithm to generate a log cluster hierarchy for the logs of the fourth set;

aligning the logs of the fourth set within each cluster associated with a given level of the log cluster hierarchy;

conducting log motif discovery on the aligned logs to find log motifs; and performing pattern recognition from the log motifs by recognizing one or more log fields.

19. The computer program product as recited in claim 17, wherein performing the log filtering process further comprises:

determining if the fifth set is empty;

in response to determining that the fifth set is empty:

updating the third set by subtracting the fourth set from the third set;

in response to determining that the updated third set is empty, outputting the second set; and in response to determining that the updated third set includes at least one log, updating the fourth set by sampling the updated third set, and updating the fifth set by performing automatic pattern recognition using the updated fourth set; and in response to determining that the fifth set includes at least one log pattern:

updating the second set by adding the fifth set to the second set;

updating the third set with logs identified in the third set that lack a matching pattern in the second set;

in response to determining that the updated third set is empty, outputting the updated second set; and in response to determining that the updated third set includes at least one log, updating the fourth set by sampling the updated third set, and updating the fifth set by performing automatic pattern recognition using the updated fourth set.

20. The computer program product as recited in claim 19, wherein the method further includes using a log parser to identify the logs in the third set that lack a matching pattern in the second set.

* * * * *